US012007922B2

United States Patent
Magyar et al.

(10) Patent No.: US 12,007,922 B2
(45) Date of Patent: Jun. 11, 2024

(54) IO-LINK SYSTEM WITH DIAGNOSTIC CHANNEL

(71) Applicant: Balluff GmbH, Neuhausen (DE)

(72) Inventors: Norbert Magyar, Veszprem (HU); Zoltan Kasa, Marko (HU)

(73) Assignee: BALLUFF GMBH, Neuhausen (DE)

( * ) Notice: Subject to any disclaimer, the term of this patent is extended or adjusted under 35 U.S.C. 154(b) by 0 days.

(21) Appl. No.: 17/712,832

(22) Filed: Apr. 4, 2022

(65) Prior Publication Data
US 2022/0327076 A1    Oct. 13, 2022

(30) Foreign Application Priority Data
Apr. 8, 2021 (DE) .......................... 102021108770.8

(51) Int. Cl.
*G06F 13/362* (2006.01)
*G06F 11/34* (2006.01)

(52) U.S. Cl.
CPC ........ *G06F 13/362* (2013.01); *G06F 11/3485* (2013.01)

(58) Field of Classification Search
CPC ............. G06F 11/3485; G06F 11/3041; G06F 11/3058; G06F 13/42; G06F 13/404; G06F 13/4213; G06F 13/4217; G06F 13/4221; G06F 13/4247; G06F 13/425; G06F 13/3625; G06F 13/362; G06F 13/36; G06F 13/364; G06F 13/38; G06F 1/04; G06F 1/14; G06F 1/12; H04L 43/02; H04L 43/024; H04L 43/026; H04L 43/04; H04L 43/08
See application file for complete search history.

(56) References Cited

U.S. PATENT DOCUMENTS 10,430,359 B2 * 10/2019 Feinaeugle ........ G05B 19/0425
2015/0003503 A1 * 1/2015 Cassata ............... H04L 25/0292
29/854

(Continued)

FOREIGN PATENT DOCUMENTS

DE  102012009494 A1  11/2013
DE  102014106752 A1  11/2015
DE  102016217706 A1  3/2017

OTHER PUBLICATIONS

Deutsche Norm, "Low-voltage switchgear and controlgear Part 5-2: control circuit devices and switching elements—Proximity switches", , Publisher: DIN EN 60947-5-2 (VDE 0660-208) Jan. 2014.

*Primary Examiner* — Raymond N Phan
(74) *Attorney, Agent, or Firm* — GableGotwals

(57) ABSTRACT

The invention relates to an IO-Link system comprising at least one IO-Link master (1), at least one IO-Link device (2) and at least one IO-Link-capable infrastructure component (30). The at least one IO-Link master (1) and the at least one IO-Link device (2) are connected via the at least one infrastructure component (30) and exchange data via a data channel (K1). The infrastructure component (30) has an apparatus (61, 62) for recording diagnostic data. A diagnostic channel (K2) is provided in the IO-Link system, via which diagnostic channel (K2) the diagnostic data can be sent and received between the at least one infrastructure component (30) and the at least one IO-Link master (1) separately from the data channel (K1).

15 Claims, 5 Drawing Sheets

(56) References Cited

U.S. PATENT DOCUMENTS

| | | | |
|---|---|---|---|
| 2018/0113429 A1* | 4/2018 | Krumsiek | H04L 12/40019 |
| 2019/0325731 A1* | 10/2019 | Gaggero | H04B 5/0031 |
| 2020/0080916 A1* | 3/2020 | Linne | F16C 19/527 |
| 2020/0278943 A1* | 9/2020 | Schäfer | G06F 13/4068 |
| 2021/0075644 A1* | 3/2021 | Bagalá | H04B 3/02 |
| 2022/0155745 A1* | 5/2022 | Higa | G05B 19/056 |

* cited by examiner

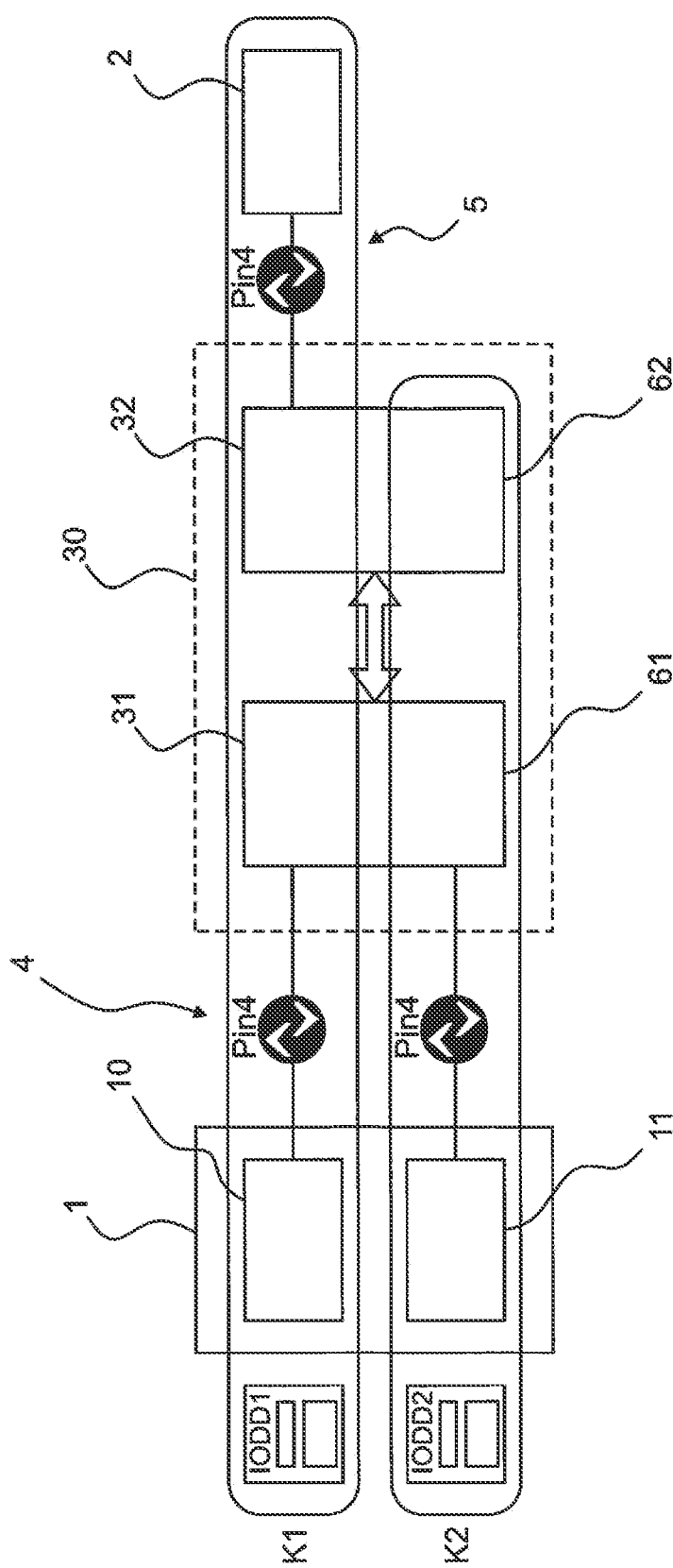

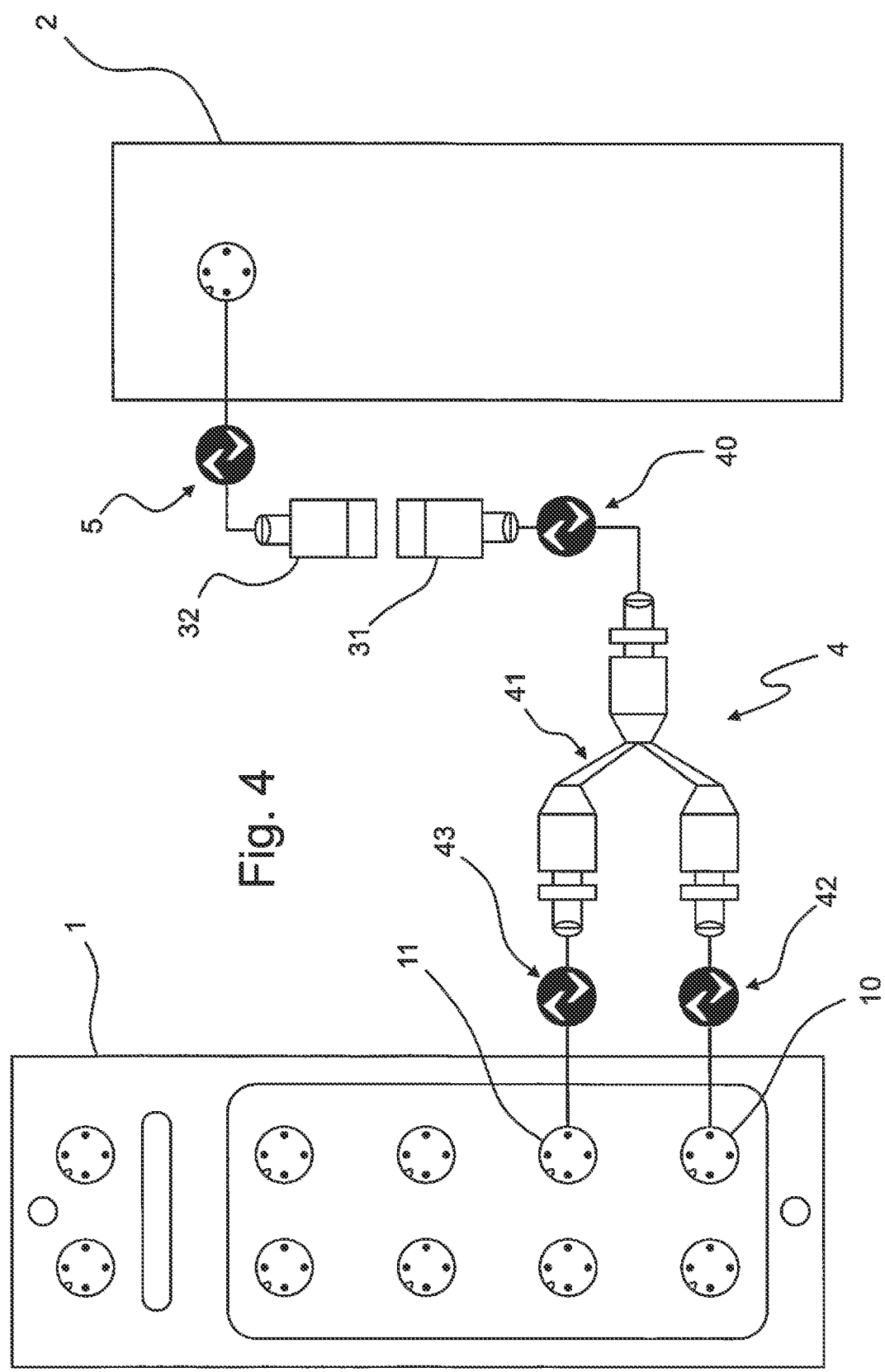

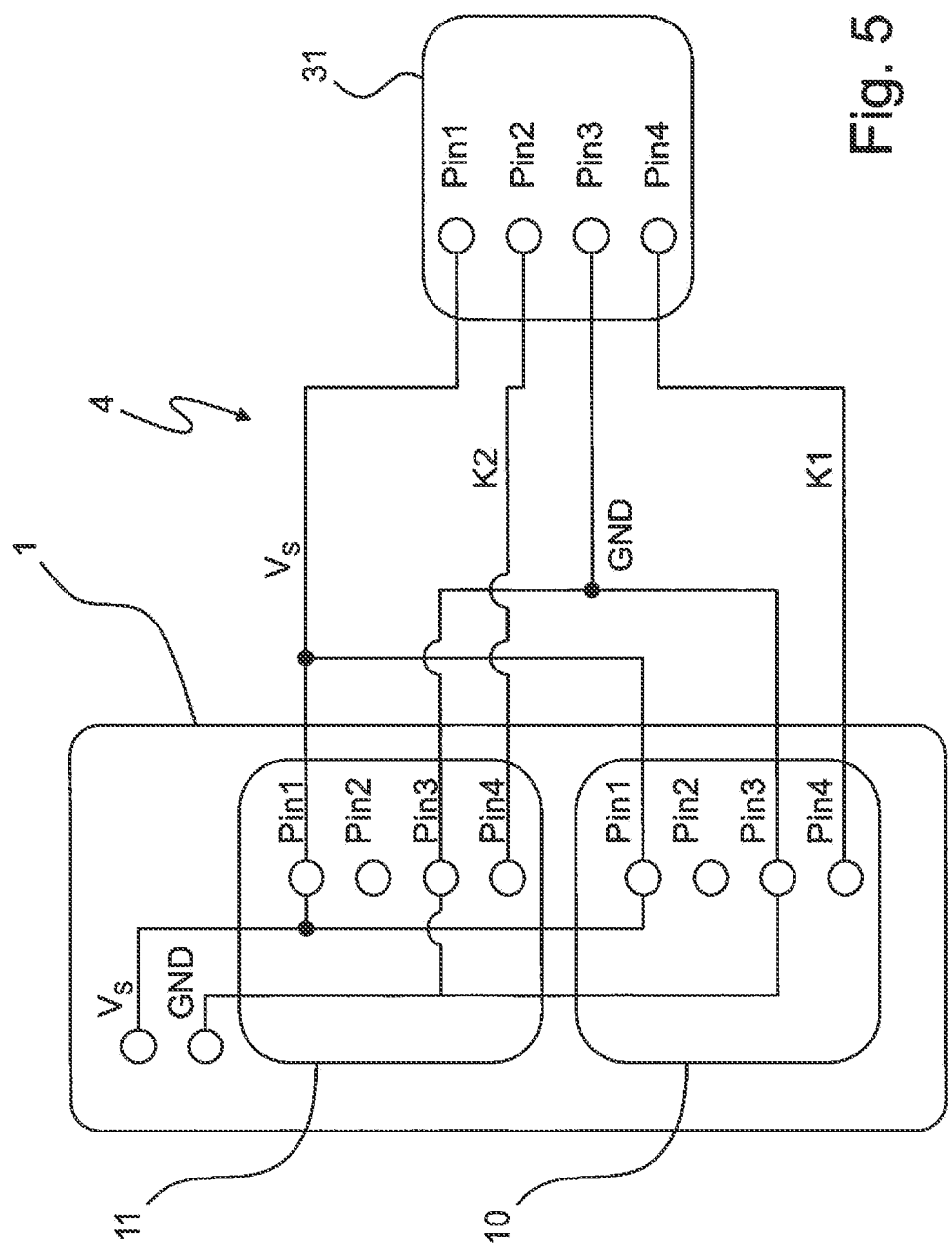

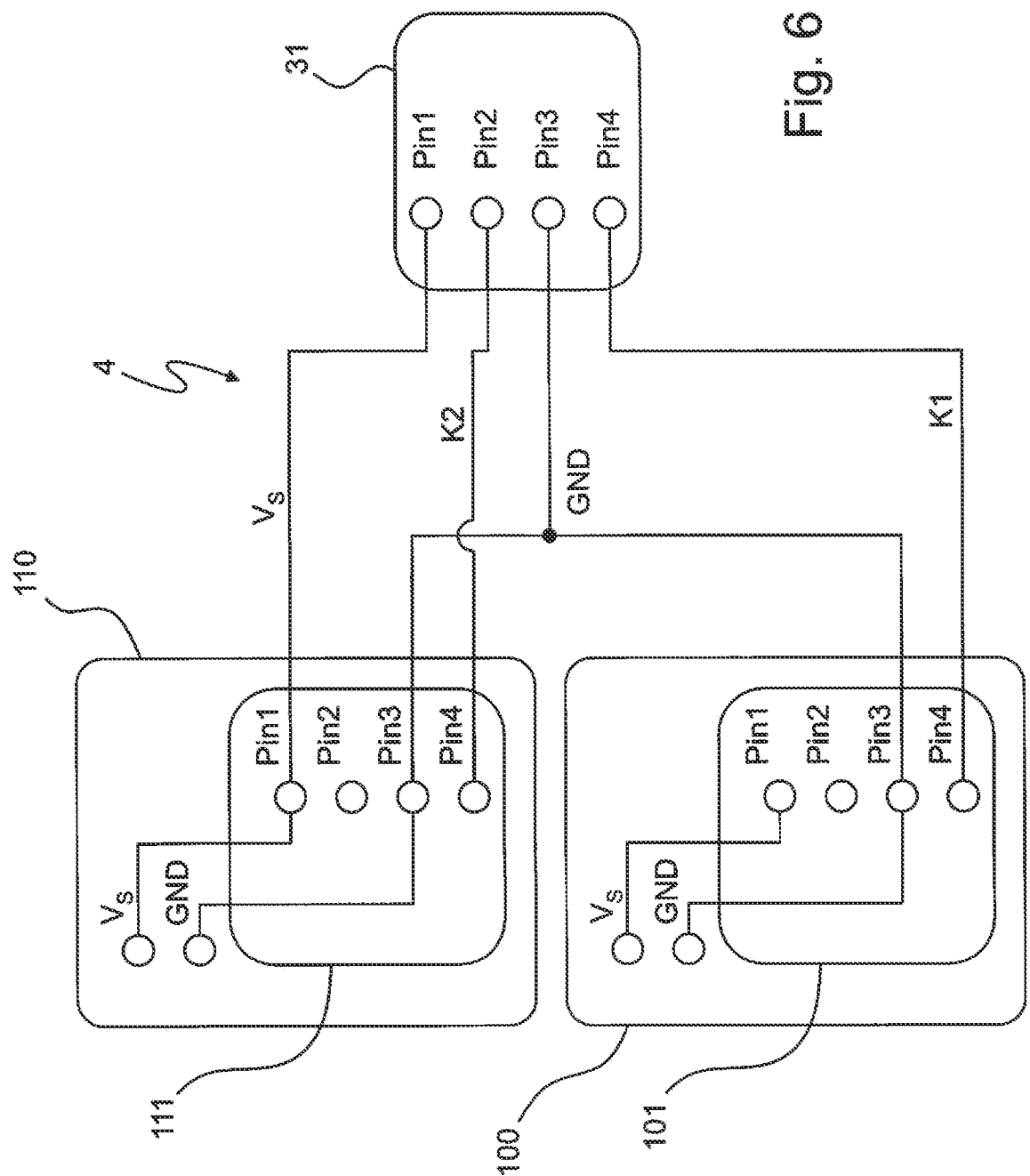

IO-LINK SYSTEM WITH DIAGNOSTIC CHANNEL

CROSS-REFERENCE TO RELATED APPLICATIONS

This United States application claims priority to German Patent Application No. 10 2021 108 770.8 filed 8 Apr. 2021, which is incorporated herein by reference.

The present invention relates to an IO-Link system in which a diagnostic channel is provided, via which diagnostic data can be transmitted and received separately from a data channel. The invention further relates to a method for operating such an IO-Link system.

PRIOR ART

In mechanical and plant engineering as well as in automation technology, numerous standardised fieldbus systems have proven themselves as an alternative to parallel individual cabling. Here, a number of so-called fieldbus modules are connected to a central control device via a fieldbus. Terminal devices are in turn connected to the fieldbus modules.

To connect the terminal devices to the fieldbus modules, so-called "IO-Link" connections have also been used more recently.

A consortium of affected manufacturers has specified a standard for an intelligent sensor/actuator interface with the named designation "IO-Link", which is standardised as an international open standard in the IEC 61131-9 standard.

Such an IO-Link connection as well as a method and a control device for operating such a connection are known from DE 10 2012 009 494 A1. As described there, the fieldbus modules assume the role of an IO-Link "master". The terminal devices (hereinafter referred to as devices) can be, for example, sensors, actuators, display devices, operating devices, or even drives on machines.

Such an IO-Link connection provides a serial point-to-point connection for signal transmission between sensors and actuators and the IO level of the particular machine. Basically, an IO-Link connection transmits data between the IO-Link master and an IO-Link device connected as a "slave".

Said IO-Link devices are described via description files IODD, IO-Link Device Description. This description file contains specific information about the IO-Link device assigned to it. This includes information on identification, device parameters, process and diagnostic data, communication properties and the structure of the user interface. The IODD as a description language is also to be standardised as an open standard in the ISO 15745 standard. The IODD is used by project planning tools (computer program) in order to be able to display the setting options and data interface of the device graphically and in a user-friendly manner.

When using IO-Link connections, so-called IO-Link-capable infrastructure components can be used. These infrastructure components are involved in the transmission of data between the IO-Link master and the IO-Link device. IO-Link masters and IO-Link devices are not infrastructure components. For example, the infrastructure component can be an inductive coupler that provides a wireless connection over which data are transmitted wirelessly from the IO-Link master to the IO-Link device and in the opposite direction across a distance, for example an air gap. Such an IO-Link-capable inductive coupler is disclosed in DE 10 2014 106 752 A1, to which reference is made here. The infrastructure component can also be an IO-Link repeater, which is used for wired transmission when the cable length exceeds 20 m, or an IO-Link sniffer.

A communication channel in which an infrastructure component has no influence on the structure of the data of the IO-Link device (also referred to hereinafter as device data) is called a transparent channel. In the case of a transparent channel, all capabilities of the connected IO-Link device can be used without restrictions, both during operation and configuration.

It is therefore desired that the infrastructure components provide a transparent communication channel. This means that separate IODDs are not required for the devices connected via an infrastructure component, and instead the IO-Link master can continue to use the original IODD of the IO-Link device.

In order to monitor the function of the IO-Link system, diagnostic data regarding the current state of the infrastructure component, for example its input voltage, its output current, an efficiency of energy transmission, the intrinsic temperature of the component, the signal quality and/or the like, or regarding the state of the environment of the infrastructure component, for example vibrations, the ambient temperature, the humidity, the gradient and/or the like, are recorded.

Usually, the diagnostic data of the infrastructure component are transmitted via the same data channel as the device data of the IO-Link device. Accordingly, the data transmitted to the IO-Link master are dependent on the diagnostic data and thus also on the used infrastructure component. Consequently, the data channel is no longer transparent.

It is the object of the invention to provide diagnostic data of the infrastructure components and to transmit said data in such a way that the data channel is transparent.

DISCLOSURE OF THE INVENTION

An IO-Link system is proposed which has at least one IO-Link master, at least one IO-Link device and at least one IO-Link-capable infrastructure component. The at least one IO-Link master and the at least one IO-Link device are connected via the at least one infrastructure component and exchange data via a data channel, i.e. via an IO-Link communication channel. In this regard, a conventional IO-Link system can be used.

According to the invention, the infrastructure component has an apparatus for recording diagnostic data. This can be a sensor or a measuring device, for example. In particular, the apparatus for recording diagnostic data can record the current state of the infrastructure component, for example can measure the input voltage and/or the output current, determine the efficiency of the energy transmission, record the intrinsic temperature of the component, determine the signal quality and/or the like. Additionally or alternatively, the apparatus for recording diagnostic data may record the current state of the environment of the infrastructure component, for example may determine vibrations, ambient temperature, humidity, gradient and/or the like. By means of the apparatus for recording diagnostic data of the infrastructure component, diagnostic data can be recorded directly on or in the infrastructure component.

As already described, a data channel is provided in the IO-Link system as an IO-Link communication channel between the at least one IO-Link master and the at least one IO-Link device, via which data are transmitted from the at least one IO-Link master to the at least one IO-Link device—for example control commands—and via which device data are transmitted from the at least one IO-Link device to the at least one IO-Link master—for example measurement data.

According to the invention, a diagnostic channel is also provided, independently of the data channel, as a further IO-Link communication channel between the at least one IO-Link-capable infrastructure component and the at least one IO-Link master. The diagnostic data recorded by the apparatus for recording diagnostic data of the infrastructure component are sent to the at least one IO-Link master via the diagnostic channel and received there. The diagnostic channel and the data channel are independent of each other, so that the diagnostic data is sent and received via the diagnostic channel separately from the data channel and the device data sent therein.

By separating the data channel and the diagnostic channel, the data between the IO-Link device and the IO-Link master, i.e. in particular measurement data and control commands, are transmitted to the IO-Link master independently of the diagnostic data of the infrastructure component and can therefore also be evaluated independently of each other. Consequently, the data channel remains free from diagnostic data of the infrastructure component, which offers the great advantage that the data channel is transparent. The IO-Link master cannot distinguish the transmitted device data from data that would have been transmitted via a direct connection between the IO-Link master and the IO-Link device without infrastructure component. In this way, the at least one IO-Link master can be provided with a description file, in particular IODD (IO-Link Device Description), for the device data of the data channel, which description file is only dependent on the at least one IO-Link device. A further description file, in particular IODD, for the diagnostic data of the diagnostic channel can additionally be provided to the at least one IO-Link master independently of the first-mentioned description file and may be dependent only on the infrastructure component. The description files can be made available to the IO-Link master independently of each other and only in relation to the particular component.

One way of separating the data channel and the diagnostic channel at the IO-Link master is achieved if the at least one IO-Link master has a plurality of IO-Link ports. The data channel is then fed to one IO-Link port of the IO-Link master and the diagnostic channel is fed to another IO-Link port of the IO-Link master. This is already possible with an IO-Link master that has at least two IO-Link ports. The IO-Link master can use different IODD for the different IO-Link ports. Thus, a simple and cost-effective separation of the channels is possible with as few components as possible.

Another way of separating the data channel and the diagnostic channel at the IO-Link master is achieved if two IO-Link masters are provided. The data channel is then connected to an IO-Link port of one IO-Link master and the diagnostic channel is connected to an IO-Link port of the other IO-Link master. The IO-Link masters may each have only one IO-Link port. This enables simple and cost-effective separation of the channels with the simplest possible components.

Preferably, the connection between the at least one IO-Link master and the primary side of the at least one IO-Link-capable infrastructure component is realised as a 4-pole or 5-pole plug connection. This establishes a wired connection typical for IO-Link. Each pole of the plug connection is realised by a separate pin.

In this case, it is advantageous that the data channel is routed via one pin of the plug connection and the diagnostic channel is routed via another pin of the plug connection. In this way, the channels are already separated from each other in the same plug connection without the need for further plug connections. In principle, a plurality of plug connections can be provided and the data channel and the diagnostic channel can be routed via different plug connections. However, a single plug connection is advantageous because there is usually little installation space available for further connections, especially on the infrastructure component. In the IEC 60974-5-2 standard, the IO-Link plug connections are specified in accordance with the IP65/67 connection technology in such a way that pins 1 and 3 are used for the power supply and pin 4 is provided for the data channel. Here, it is possible to realise the diagnostic channel at least in part via pin 2.

At the IO-Link master, the plug connection is designed separately as described above. For this purpose, the plug connection can, for example, be divided into two separate plug connections, in particular via a Y-line, wherein the data channel runs via pin 4 of one plug connection to one of the IO-Link ports and the diagnostic channel is transferred from pin 2 to pin 4 of the other plug connection and runs via pin 4 of the other plug connection to another IO-Link port. Pin 4 is provided in the IO-Link port of the IO-Link master as standard for the transmission of data, so that no adaptations are necessary on the master and commercially available IO-Link masters can be used.

The IO-Link-capable infrastructure component is preferably an IO-Link-capable inductive coupler. Such an IO-Link-capable inductive coupler is disclosed in DE 10 2014 106 752 A1, to which reference is hereby made. The IO-Link-capable inductive coupler provides a wireless connection via which data can be transmitted wirelessly from the IO-Link master to the IO-Link device and in the opposite direction across a distance, for example an air gap. Alternatively, the IO-Link-capable infrastructure component can also be an IO-Link repeater, which is used for wired transmission when the cable length exceeds 20 m, or an IO-Link sniffer.

Furthermore, a method for operating the above-mentioned IO-Link system is proposed. The method comprises the following steps: the data channel of the connection between the at least one IO-Link device and the at least one IO-Link master is provided. For this purpose, the connection is established, for example by connecting the at least one IO-Link device and the at least one IO-Link master to each other via a plug connection, and furthermore, a communication is established from the IO-Link master to the IO-Link device. Depending on the at least one IO-Link device, a description file, for example IODD, is then provided to the at least one IO-Link master for the device data of the data channel. The IODD can, for example, be attached to the IO-Link device or can be downloaded online accordingly.

In addition, a diagnostic channel of the connection between the at least one IO-Link-capable infrastructure component and the at least one IO-Link master is provided. Also for this, the connection is established, for example by connecting the at least one infrastructure component and the at least one IO-Link master to each other via a plug connection, wherein the plug connection can also be at least partially the above-mentioned plug connection, and also by establishing communication from the IO-Link master with the at least one infrastructure component, via which diagnostic data can be transmitted. The diagnostic channel is separated from the data channel as described above.

Depending on the at least one IO-Link-capable infrastructure component, a further description file, for example IODD, is then provided to the at least one IO-Link master for the diagnostic data of the diagnostic channel. The IODD can, for example, be attached to the IO-Link-capable infrastructure component or can be downloaded online accordingly. Lastly, the device data are evaluated and the diagnostic data are evaluated independently.

By separating the data channel and the diagnostic channel and evaluating the device data and the diagnostic data separately, the data channel remains free of diagnostic data from the infrastructure component, which offers the advantage that the data channel is transparent, i.e. only dependent on the IO-Link device, as explained above.

BRIEF DESCRIPTION OF THE DRAWINGS

Exemplary embodiments of the invention are shown in the drawings and explained in more detail in the following description.

FIG. 3 shows a schematic depiction of an IO-Link system according to one embodiment of the invention.

FIG. 4 schematically shows an overall view of the IO-Link system according to one embodiment of the invention.

FIG. 5 shows a circuit diagram of the IO-Link system according to one embodiment of the invention.

FIG. 6 shows a circuit diagram of the IO-Link system according to a further embodiment of the invention.

EXEMPLARY EMBODIMENTS OF THE INVENTION

Figure 1:
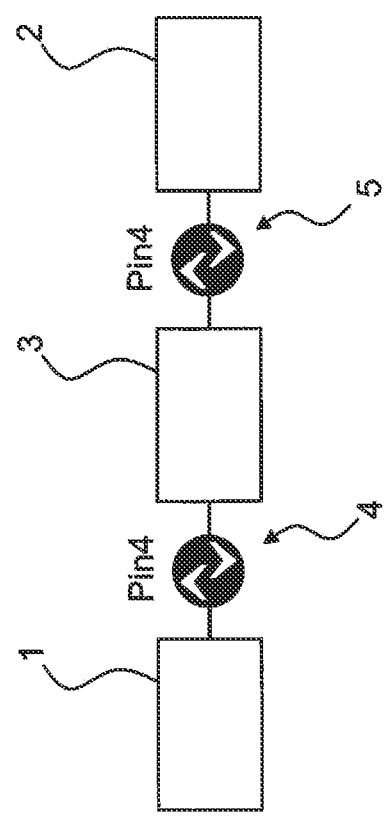
FIG. 1 shows a schematic depiction of an IO-Link system according to the prior art.

FIG. 1 shows a schematic depiction of an IO-Link system according to the prior art. An IO-Link system always has an IO-Link master 1 and an IO-Link device 2. Also shown is an IO-Link-capable infrastructure component 3. The infrastructure component 3 is involved in the transmission of data between the IO-Link master 1 and the IO-Link device 2. The infrastructure component can be, for example, an inductive coupler, an IO-Link repeater, an IO-Link sniffer or the like. The IO-Link master 1 is connected to the infrastructure component 3 via a wired IO-Link plug connection 4 and the IO-Link device is connected to the infrastructure component 3 via another wired IO-Link plug connection 5. Pin 4 of the plug connection 4, 5 is usually used for data transmission. The pin assignment will be explained below in conjunction with FIG. 2.

Figure 2:
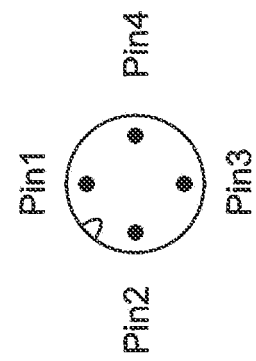
FIG. 2 shows a 4-pole IO-Link plug connection according to the prior art.

FIG. 2 shows a conventional 4-pole IO-Link plug connection according to the prior art, which has a total of four pins: Pin 1, Pin 2, Pin 3, Pin 4 (in the following, the pins will be referred to as "pin 1" to "pin 4" according to the naming in the plug connection). In the IEC 60974-5-2 standard, the IO-Link plug connections are specified in accordance with IP65/67 connection technology in such a way that pin 1 and pin 3 are used for power supply and the data are transmitted via pin 4. Pin 2 is unassigned in the standard and can be used as an additional digital channel, for example. The plug connections 4 and 5 described hereinafter are designed accordingly. Instead of a 4-pole IO-Link plug connection, a 5-pole IO-Link plug connection (not shown) can also be used. Depending on the class of the plug connection, the function of the fifth pin is not predefined or an additional supply voltage is provided via the fifth pin.

FIG. 3 shows a schematic representation of an IO-Link system according to an embodiment of the invention. The infrastructure component in this case is an IO-Link-capable inductive coupler 30 as described in DE 10 2014 106 752 A1. However, any other infrastructure component 3, in particular one of the aforementioned, may also be provided. The inductive coupler 30 has a base 31 and a remote 32, between which an inductive coupling takes place. This provides a wireless connection via which data are transmitted wirelessly from the IO-Link master 1 to the IO-Link device 2 and in the opposite direction across a distance, for example an air gap. The base 31 and the remote 32 each have a sensor 61, 62, with which the state of the inductive coupler 30, i.e. for example its input voltage, its output current, the efficiency of the energy transmission, the intrinsic temperature of the base 31 or the remote 32, the signal quality and/or the like, is detected, or with which the state of the environment of the inductive coupler 30, i.e. vibrations, the ambient temperature, the humidity, the gradient and/or the like, is detected. Only one sensor 61, 62, for example the sensor 61 in the base 31, may also be provided.

The inductive coupler 30 is connected to the IO-Link master 1 via an IO-Link plug connection 4 and to the IO-Link device 2 via a further IO-Link plug connection 5, as shown in FIG. 1. In this embodiment, the IO-Link master 1 has two IO-Link ports 10, 11. Device data, for example measurement data, of the IO-Link device 2 are transmitted to the first IO-Link port 10 in a first IO-Link communication channel, which is referred to hereinafter as the data channel K1. For this purpose, the device data continue to be transmitted in each case via pin 4 of the two plug connections 4, 5 (and by means of the inductive coupling in the inductive coupler 30). The same applies to data sent from the IO-Link master 1 to the IO-Link device 2, for example control commands. In other words, the data channel K1 is routed via pin 4 of the particular plug connection 4, 5. The data channel K1 is transparent, since the data transmitted therein are not fundamentally changed by the inductive coupler 30. The IO-Link master 1 cannot infer the presence of the inductive coupler 30 from the device data received at the first port 10 and cannot distinguish them from device data that would have been transmitted via a direct plug connection. Data that are received or transmitted by the data channel K1 via the first IO-Link port 10 of the IO-Link master 1 are described by means of an IO-Link device description IODD1. Since the data channel K1 is transparent, the IODD1 is only dependent on the IO-Link device 2. In practice, the IODD1 can be provided together with the IO-Link device 2.

In addition, a second IO-Link communication channel, referred to in the following as the diagnostic channel K2, is provided, via which diagnostic data of the sensors 61, 62 are transmitted to the second IO-Link port 11 of the IO-Link master 1. For this purpose, the diagnostic data of the sensors 61, 62 are also transmitted via the IO-Link plug connection 4. In principle, a further IO-Link plug connection can also be provided, however, this is not advantageous due to the available installation space. The diagnostic data are transmitted substantially via pin 2 of the same plug connection 4. Reference is made to the description of FIG. 4 in this regard. The diagnostic data of the sensor 62 are additionally transmitted from the remote 32 to the base 31 via the inductive coupling of the inductive coupler 30. For this purpose, the diagnostic data are modulated during the transmission so that they do not interfere with the device data. In the base 31, the diagnostic data and the device data can then be separated again without the IO-Link master 1 noticing this. The diagnostic data are thus transmitted to the second IO-Link port 11 of the IO-Link master 1 via the diagnostic channel K2 separately from the data channel K1 and consequently do not influence the data transmitted in the data channel K1. A further IO-Link device description IODD2 is only assigned to the diagnostic channel K2 and is used to describe the data that are received or transmitted by the diagnostic channel K2 via the second IO-Link port 11 of the IO-Link master 1. The IODD2 is only dependent on the IO-Link-capable infrastructure component, i.e. in this case on the inductive coupler 30. In practice, the IODD2 can be provided together with the IO-Link-capable infrastructure component.

FIG. 4 shows the practical implementation of the separate channels K1 and K2. Identical components are denoted with the same reference signs and are not described again. The plug connection 4 between the base 31 and the IO-Link ports 10, 11 of the IO-Link master 1 will be examined in more detail here. On the side of the base 31, the IO-Link plug connection 4 is designed as a single plug connection 40 that is directly connected to the base 31. Here, as described above in conjunction with FIG. 3, the data channel K1 is routed via pin 4 of the plug connection 40 and the diagnostic channel K2 is routed via pin 2 of the plug connection 40. The plug connection 40 is divided into two identical plug connections 42 and 43 by means of a Y-line 41. Pin 4 of plug connection 40 is connected to pin 4 of plug connection 42 and pin 2 of plug connection 40 is connected to pin 4 of plug connection 43. The plug connection 42 is routed to the first IO-Link port 10 of the IO-Link master 1 and the plug connection 43 is routed to the second IO-Link port 11 of the IO-Link master 2. Each IO-Link port 10, 11 now supplies the data it receives via pin 4 of one of its plug connections 42, 43 for evaluation, independently of the other plug connection 42, 43. Reference is also made to FIG. 5 in this regard.

FIG. 5 shows a circuit diagram of the IO-Link system according to the embodiment of the invention described above, in which the IO-Link master 1 has two IO-Link ports 10, 11. Pin 1 of each IO-Link port 10, 11 is connected to the voltage source and transmits the supply voltage $V_s$ to pin 1 of the base 31. Pin 3 of each IO-Link port 10, 11 provides the ground GND and is connected to pin 3 of the base 31. Pin 4 of the first IO-Link port 10 is connected to pin 4 of the base 31. The data channel K1 is routed via this connection and the device data are transmitted via the latter. The device data are then fed to an evaluation unit (not shown here) via pin 4 of the first IO-Link port 10 and are evaluated there. Pin 4 of the second IO-Link port 11 is connected to pin 2 of the base 31. The diagnostic channel K2 is routed via this connection and the diagnostic data are transmitted via the latter. Pin 4 is provided as standard in the IO-Link port 10, 11 of the IO-Link master 1 for the transmission of data, and therefore the circuit of the IO-Link master 1 corresponds to a commercially available IO-Link master. The diagnostic data are then fed to an evaluation unit (not shown here) via pin 4 of the second IO-Link port 11, independently of the first IO-Link port 10, and are evaluated there. The evaluation unit can thus evaluate the diagnostic data and the device data independently.

FIG. 6 shows a circuit diagram of the IO-Link system according to a further embodiment of the invention. In this embodiment, two IO-Link masters 100, 110 are provided, each having an IO-Link port 101, 111. In each IO-Link master 100, 110, pin 1 of the IO-Link ports 101, 111 is connected in each case to the voltage source of its IO-Link master 100, 110 and transmits the supply voltage $V_s$ to pin 1 of the base 31. The supply voltage $V_s$ is normalised for IO-Link. Pin 3 of IO-Link port 101, 111 of each IO-Link master 100, 110 provides the ground GND and is connected to pin 3 of the base 31. Pin 4 of the IO-Link port 101 of the first IO-Link master 100 is connected to pin 4 of the base 31. The data channel K1 is routed via this connection and the device data are transmitted. The device data are then fed to an evaluation unit (not shown here) via pin 4 of the IO-Link port 101 of the first IO-Link master 100 and evaluated there. Pin 4 of IO-Link port 111 of the second IO-Link master 110 is connected to pin 2 of the base 31. The diagnostic channel K2 is routed via this connection and the diagnostic data are transmitted. Pin 4 is provided in the IO-Link port 101, 111 of the IO-Link masters 100, 110 as standard for the transmission of data, so that the circuit of the IO-Link masters 100, 110 corresponds to a commercially available IO-Link master. The diagnostic data are then fed to an evaluation unit (not shown here) via pin 4 of the IO-Link port 111 of the second IO-Link master 110, independently of the first IO-Link master 100, and are evaluated there. The evaluation unit can thus evaluate the diagnostic data and the device data independently.

The invention claimed is:

1. IO-Link system, comprising
at least one IO-Link master;
at least one IO-Link device;
at least one IO link-capable infrastructure component,
wherein the at least one IO-Link master and the at least one IO-Link device are connected via the at least one infrastructure component and exchange data via a data channel (K1),
wherein the infrastructure component has an apparatus for recording diagnostic data, and a diagnostic channel (K2) is provided in the IO-Link system, via which diagnostic channel (K2) being adapted to transmit and receive the diagnostic data between the at least one infrastructure component and the at least one IO-Link master separately from the data channel (K1).

2. The IO-Link system according to claim 1, wherein the at least one IO-Link master has a plurality of IO-Link ports, and the data channel (K1) is fed to one of the plurality of IO-Link ports of the at least one IO-Link master and the diagnostic channel (K2) is fed to another of the plurality of IO-Link ports of the at least one IO-Link master (1).

3. The IO-Link system according to claim 1, wherein two IO-Link masters are provided, and the data channel (K1) is fed to one of the at least one IO-Link masters and the diagnostic channel (K2) is fed to the other at least one IO-Link master.

4. The IO-Link system according to claim 1, wherein a connection between the at least one IO-Link master and a primary side of the at least one IO-Link infrastructure component is realised as a 4-pole or 5-pole plug connection.

5. The IO-Link system according to claim 1, wherein the at least one IO-Link-capable infrastructure component is an IO-Link-capable inductive coupler.

6. The IO-Link system of claim 1, wherein the diagnostic data a current state of the infrastructure component.

7. IO-Link system of claim 1, wherein the diagnostic data is a current state of an environment of the infrastructure component.

8. The IO-Link system according to claim 4, wherein the data channel (K1) is routed via a pin (Pin 4) of the plug connection and the diagnostic channel (K2) is routed via another pin (Pin 2) of the plug connection.

9. The IO-Link system of claim 6, wherein the current state is at least one of an input voltage, an output current, an efficiency of energy transmission, an intrinsic temperature, and a signal quality.

10. The IO-Link system of claim 7, wherein the current state is at least one of a vibration, an ambient temperature, a humidity, a temperature gradient, and a humidity gradient.

11. Method for operating an IO-Link system including at least one IO-Link master; at least one IO-Link device; at least one IO link-capable infrastructure component, the at least one IO-Link master and the at least one IO-Link device being connected via the at least one infrastructure component and exchange data via a data channel (K1), the infrastructure component has an apparatus for recording diagnostic data, and a diagnostic channel (K2) provided in the IO-Link system, via which diagnostic channel (K2) the diagnostic data being transmitted and received between the at least one infrastructure component and the at least one IO-Link master separately from the data channel (K1), the method comprising the following steps:
  a) providing the data channel (K1) of the connection between the at least one IO-Link device and the at least one IO-Link master;
  b) providing a description file (IODD1) for the device data of the data channel (K1);
  c) providing the diagnostic channel (K2) of the connection between the at least one IO-Link-capable infrastructure component and the at least one IO-Link master, which is separate from the data channel (K1);
  d) providing a description file (IODD2) for the diagnostic data of the diagnostic channel (K2);
  e) evaluating the device data and evaluating the diagnostic data independently of each other.

12. The method of claim 11, wherein the diagnostic data is a current state of the infrastructure component.

13. The method of claim 11, wherein the diagnostic data is a current state of an environment of the infrastructure component.

14. The method of claim 12, wherein the current state is at least one of an input voltage, an output current, an efficiency of energy transmission, an intrinsic temperature, and a signal quality.

15. The method of claim 13, wherein the current state is at least one of a vibration, an ambient temperature, a humidity, a temperature gradient, and a humidity gradient.

* * * * *